US007193736B2

(12) United States Patent
Minagawa

(10) Patent No.: US 7,193,736 B2
(45) Date of Patent: Mar. 20, 2007

(54) INFORMATION PROCESSING APPARATUS, INFORMATION PROCESSING METHOD, AND PROGRAM STORAGE MEDIUM

(75) Inventor: Tomonori Minagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 648 days.

(21) Appl. No.: 10/610,599

(22) Filed: Jul. 2, 2003

(65) Prior Publication Data
US 2004/0090649 A1  May 13, 2004

Related U.S. Application Data

(62) Division of application No. 09/411,631, filed on Oct. 1, 1999, now Pat. No. 6,614,550.

(30) Foreign Application Priority Data

Oct. 2, 1998 (JP) .................. 10-296104
Oct. 19, 1998 (JP) .................. 10-296284

(51) Int. Cl.
*G06K 15/00* (2006.01)
(52) U.S. Cl. ..................... 358/1.13; 358/1.1
(58) Field of Classification Search ................ 358/1.1, 358/1.6, 1.13, 1.18; 345/650, 661, 676, 418; 715/706, 761
See application file for complete search history.

(56) References Cited

U.S. PATENT DOCUMENTS 6,075,615 A  6/2000  Nakamura .................. 358/1.14

| 6,535,933 B1 | 3/2003 | Takayama et al. ............ 710/14 |
| 2002/0016803 A1* | 2/2002 | Ryan et al. .................. 707/527 |
| 2005/0204304 A1* | 9/2005 | Garcia et al. ................ 715/771 |

FOREIGN PATENT DOCUMENTS

| JP | 6-291928 | 10/1994 |
| JP | 8-278871 | 10/1996 |
| JP | 10-171310 | 6/1998 |

* cited by examiner

*Primary Examiner*—Arthur G. Evans
(74) *Attorney, Agent, or Firm*—Fitzpatrick, Cella, Harper & Scinto.

(57) ABSTRACT

An information processing apparatus is aimed at changing the settings of plural items registered on an individual icon or an overall icon to the data to be processed by selecting and designating the individual icon or the overall icon as intended by the user. Each of the individual icons and the overall icons stored on an external memory are indicated on the same selection setting screen of the display device of the apparatus. Then, the central processing unit of the apparatus discriminates the icon selection status on the selection setting screen thus displayed when a pointing device or the like used to point out the icon. For this apparatus, the structure is arranged to automatically change the attribute setting conditions with respect to the data in accordance with the result of such discrimination.

12 Claims, 16 Drawing Sheets

FIG. 6

"PAPER" SETTING

|  | DEFAULT | SOURCE LIST | CHIT A | CHIT B |
|---|---|---|---|---|
| INPUT PAPER | A4 | A4 | USER-DEFINED PAPER A | USER-DEFINED PAPER B |
| OUTPUT PAPER | A4 | A4 | USER-DEFINED PAPER A | USER-DEFINED PAPER B |
| MAGNIFICATION | 100% | 100% | 100% | 100% |
| PAGE LAYOUT | 1Up | 4Up | 1Up | 1Up |
| PAPER DIRECTION | PORTRAIT | PORTRAIT | LANDSCAPE | LANDSCAPE |
| PAPER FEED | PRINTER SETTING | LOWER CASSETTE | UPER CASSETTE | MIDDLE CASSETTE |
| COPIES | 1 | 1 | 1 | 1 |
| : | : | : | : | : |

"LAYOUT" SETTING

|  | DEFAULT |
|---|---|
| PRINT SIDE | SINGLE |
| BINDING DIRECTION | LEFT/TOP |
| BINDING MARGIN | 0mm |
| : | : |

"OVERLAY" SETTING

|  | DEFAULT | CHIT A | CHIT B |
|---|---|---|---|
| PRINT FORM | NORMAL | OVERLAY | OVERLAY |
| FORM | NONE | CHIT FORM A | CHIT FORM B |
| : | : | : | : |

"GRAPHICS" SETTING

|  | DEFAULT |
|---|---|
| LIPS/IMAGE | LIPS |
| RESOLUTION | 600dpi |
| COLOR | FULL COLOR |
| TRUE TYPE | REPLACE |
| TYPE WING | USE |
| : | : |

"MAIN" SETTING

|  | DEFAULT | SOURCE LIST | CHIT A | CHIT B |
|---|---|---|---|---|
| PAPER | DEFAULT | SOURCE LIST | CHIT A | CHIT B |
| LAYOUT | DEFAULT | DEFAULT | DEFAULT | DEFAULT |
| OVERLAY | DEFAULT | DEFAULT | CHIT A | CHIT B |
| GRAPHICS | DEFAULT | DEFAULT | DEFAULT | DEFAULT |

INFORMATION PROCESSING APPARATUS, INFORMATION PROCESSING METHOD, AND PROGRAM STORAGE MEDIUM

This is a divisional application of application Ser. No. 09/411,631, filed Oct. 1, 1999 now U.S. Pat. No. 6,614,550.

BACKGROUND OF THE INVENTION

1. Field of the Invention

The present invention relates to an information processing apparatus and an information processing method for handling a plurality of item settings altogether when arranging the settings by use of a device that executes a specific functional process on the graphical user interface. The invention also relates to a storage medium that stores the procedures of such process.

2. Related Background Art

In general, the information processing apparatus, which can communicate with the device that executes a specific functional process, is able to effectuate various settings though the user interface. In recent years, such device is made to handle many setting items, and plural setting items are registered altogether when each of them has complicated relations through which the items are dependent with each other among themselves. Then, the user selects the complex setting thus registered to make it easier to change the plural items at a time.

Now, for the printer driver manufactured by Canon Inc., for example, it is made possible to change settings by selecting each icon suitable for the desired print object from among a number of icons arranged as a set for the items related to the print quality or the like, such as the transformation of True Types, with respect to the graphic mode, resolution, colors, and fonts. However, other items than those mentioned above, such as the size of input paper, the size of output paper, the type of paper feed, the type of paper discharge, the required number of printed sheets, the page layout, and other physical settings, are not made available in such icon arrangement. Therefore, each of these settings should be performed each individually.

When printing should be performed in several kinds of specific formats in a bank or in an insurance company, for example, it is inconvenient if settings should be made individually per paper sheet to be used, information of paper feed, and some related items.

Now, conceivably, it may be possible to deal with all the items as the registration objects. Then, there is an advantage in the settings of the items referred to the preceding paragraphs. However, when the icon thus arranged is selected only for the purpose to modify the print quality, the paper size, the paper feed method, and others should also be reset inevitably at all times. Then, such related items should be set again after all. This is extremely inconvenient. Also, if all the necessary setting items are registered altogether as the respective sets including the paper size, the paper feed method, and the related items thereto, the number of icons become so many that there is a probability that the system facility is made inferior on the contrary.

SUMMARY OF THE INVENTION

In consideration of the problems discussed above, the present invention is designed. It is a first object of the invention to provide an information processing apparatus having the registration of each individual icon that represents the combination of a plurality of setting items in each of the groups, as well as the registration of the combination of the respective individual icons together with the overall icon, and then, being made capable of selecting the aforesaid each individual icon thus registered, and the overall icon on the same setting selection display screen of the apparatus.

It is a second object of the invention to provide an information processing apparatus capable of making a desired setting from among the required several sets by substituting the basic settings (all-item setting) with the override setting which is prepared in advance for the arbitrary items along with the basic settings to deal with all the items.

Other objectives and advantages besides those discussed above will be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6 is a view which shows one example of the setting information to be registered in advance on the external memory indicated in FIG. 2.

DETAILED DESCRIPTION OF THE PREFERRED EMBODIMENTS

Figure 1:
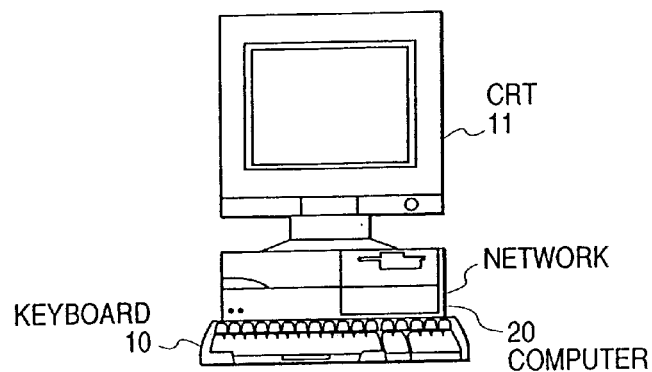
FIG. 1 is a view which illustrates the structure of the information processing apparatus having the system in accordance with the present embodiment.

FIG. 1 shows one example of a system to which the present invention is applicable, the system centering on a personal computer, for instance. The system comprises a keyboard 10 serving as an input device; a computer 20; a CRT 11 serving as a display device, and some others. The present embodiment is directed to the control based on a printer driver stored in the personal computer connected to the network shown in FIG. 1.

Figure 2:
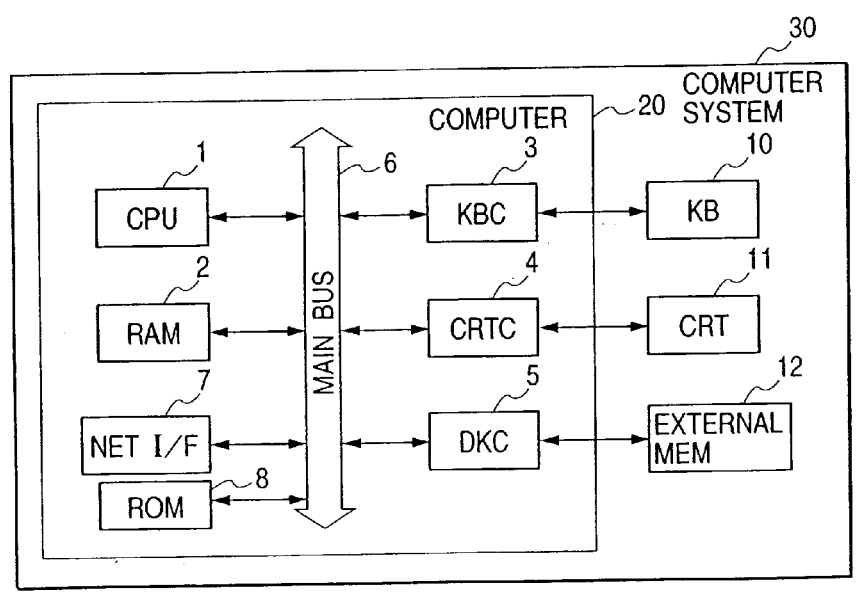
FIG. 2 is a block diagram which illustrates the control structure of the information processing apparatus having the system in accordance with the present embodiment.

FIG. 2 shows a block diagram which illustrates the control structure of the information processing device in accordance with the present embodiment. The same reference marks are applied to the same parts as those referred to in FIG. 1.

In FIG. 2, a computer system 30 comprises the computer 20 and peripheral devices, such as the keyboard 10, the CRT 11, and an external memory 12, which can be connected with the computer.

For the computer 20, a reference numeral 1 designates the CPU which processes various data by loading on the RAM 2 the boot program, the system program, the application programs, and the drivers, among some others, which are stored on the external memory 12 formed by hard disk or the like, for example.

In this respect, the RAM 2 can expand the storage capacity thereof by the installation of optional RAM and others. The RAM provides the work area for the CPU 1. A reference numeral 3 designates the keyboard controller (KBC) to control the key inputs from the keyboard (KB) 10 that includes a pointing device which is not shown.

A reference numeral 4 designates the CRT controller (CRTC) to control the display of the CRT 11; 5, the disk controller (DKC) to control each access to the external memory 12, such as FD, HD, CD-ROM, MD, or MO, that stores the boot program, the various applications, the data files, and some others; and 6, the main bus that connects each of the devices for the execution of the data access.

Figure 22:
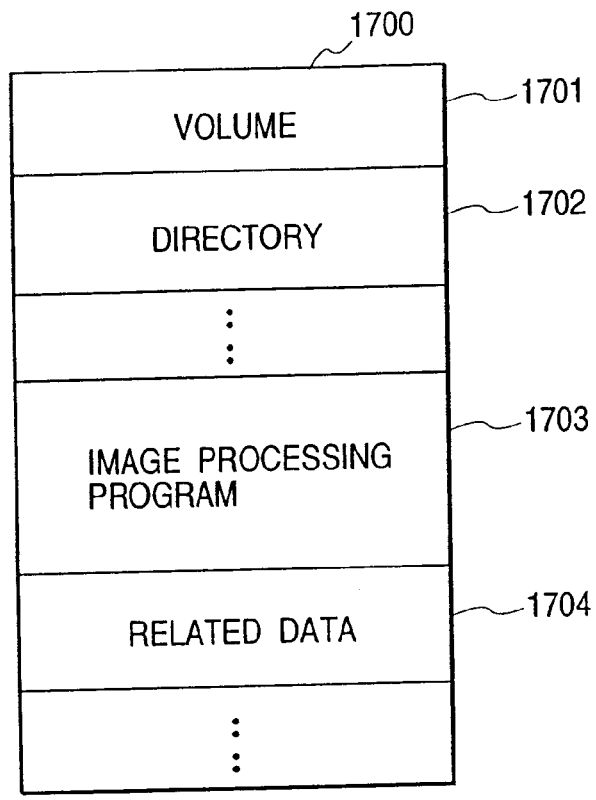
FIG. 22 is a view which shows the data contents on the external memory.

In FIG. 22, a reference numeral 1700 designates the data contents of the external memory 12 (the FD (floppy disk) in particular); 1701, the volume information that indicates the data information; 1702, the directory information; 1703, the control program of the icon registration for the printer driver which will be described in accordance with the present embodiment; and 1704, the related data therefor. The control program 1703 is arragned to be the program codes in accordance with the control procedures shown in FIG. 7, FIG. 12, FIG. 16, and FIG. 20 to be described latger.

A reference numeral 8 designates the ROM that stores the operating process procedures of the CPU 1. For the ROM 8, there are the program ROM that stores the control program to execute the printer driver program for converting the document data produced by the document processing application stored on the external memory 12 into the printing data, and to operate the system hereof, and also, the data ROM that stores the information and others required for the operation of the system. The program, which is stored on the program ROM, is the control program arranged in accordance with the flowcharts shown in FIG. 7 and others, which will be described later.

A reference numeral 7 designates the network interface (Net I/F) that controls the data transfer control between computers, as well as the data control of the data transfer through the network system (internet or the like).

Figure 21:
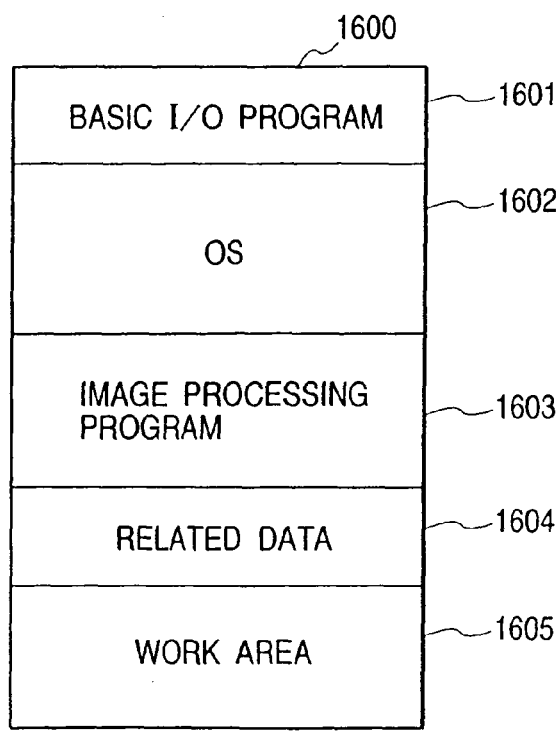
FIG. 21 is a view which shows the memory map in the executable condition with the printer driver control program having been loaded on the RAM.

FIG. 21 shows the memory map in the executable condition with the RAM 2 having the control program of the printer driver of the present embodiment loaded thereon.

In accordance with the present embodiment, the example has been shown in which the control program and the related data are loaded from the external memory 12 to the RAM directly. Besides this arrangement, it may be possible to load the control program from the external memory 12 to the RAM 2 per operation of the control program stored on the external memory 12.

A reference numeral 1601 designates the basic I/O program which reads the OS from the external memory to the RAM 2 when the information processing apparatus is turned on, and also, it has a program which is provided with the IPL (initial program loading) function and the like to initiate the OS operation. The OS is developed at 1602, the control program, at 1603, and the related data, at 1604, respectively. Then, a reference numeral 1605 designates the work area where the CPU 1 executes the control program hereof.

Here, for the present invention, unless otherwise stated, the CPU 1 controls the RAM 2, the KBC 3, the CRTC 4, the DKC 5, and the ROM 6 through the main bus 6. The control program of the host computer is stored on the ROM 8 or the external memory 12, and loaded therefrom to be developed on the RAM 2 at the time of execution for the performance thereof.

With the computer system 30 thus arranged, the detailed settings of the application and the device drivers are revised by opening the user interface. Then, the system accepts the input by the KB 10 or the pointing device (not shown) handled by the user, and indicate the current status or the process thereof on the display screen (CRT 11). Also, in accordance with the embodiments of the present invention, the contents of plural setting items are registered on the icon or with the selection of the icon, the set value is reflected on the data. However, unless otherwise state, the registration process is executed with respect to the RAM 2 or the external memory 12.

Also, in accordance with the present embodiment, it is assumed that the information (icon), which is set by the user and provided for the aforesaid memory resources in the procedures given below, is registered. Hereinafter, the default for each of the groups, and the default for the system as a whole are prepared in advance. Also, for each of the groups, the user's arbitrary setting is registered (the icon and name are provided accordingly). Further, the combination of each arbitrary icon of each group is registered as "overall" (and provided with the icon and name accordingly).

Also, for the proposal hereof, the description will be made of the portion where the icons are selected for the utilization of the registered contents thereof, respectively.

Figure 3:
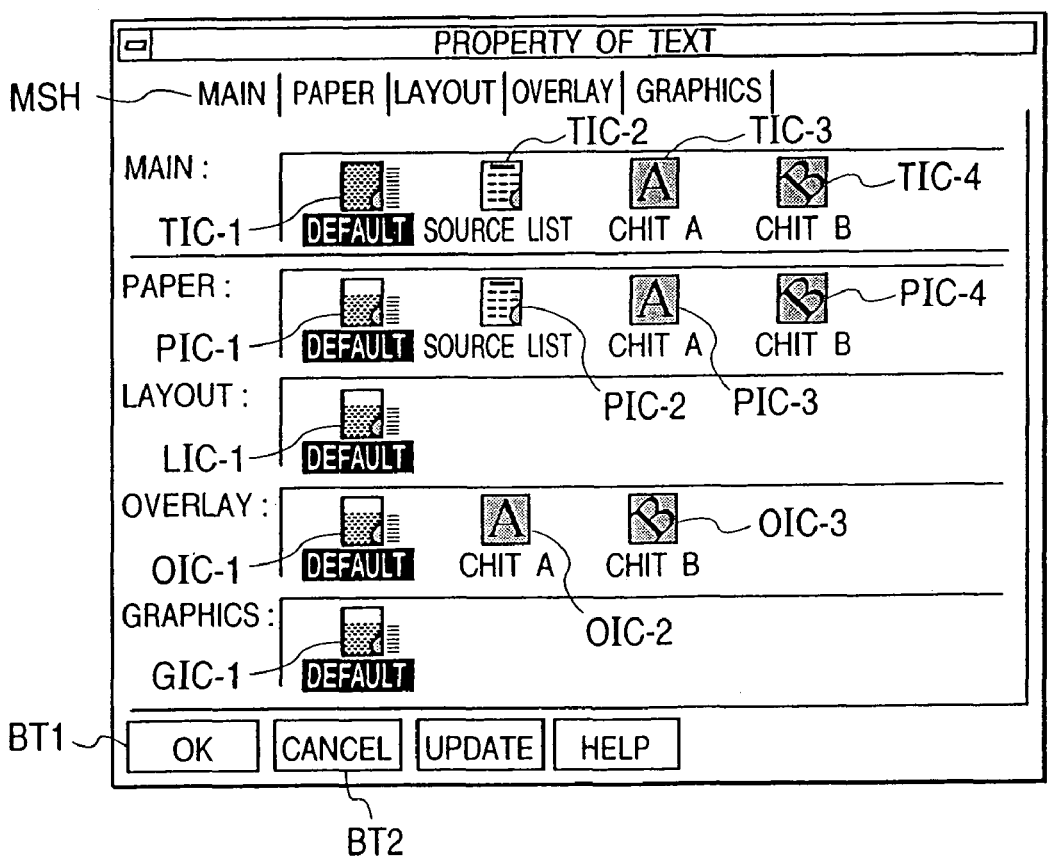
FIG. 3 is a view which shows one example of the user interface (UI) screen displayed on the CRT indicated in FIG. 2.
Figure 4:
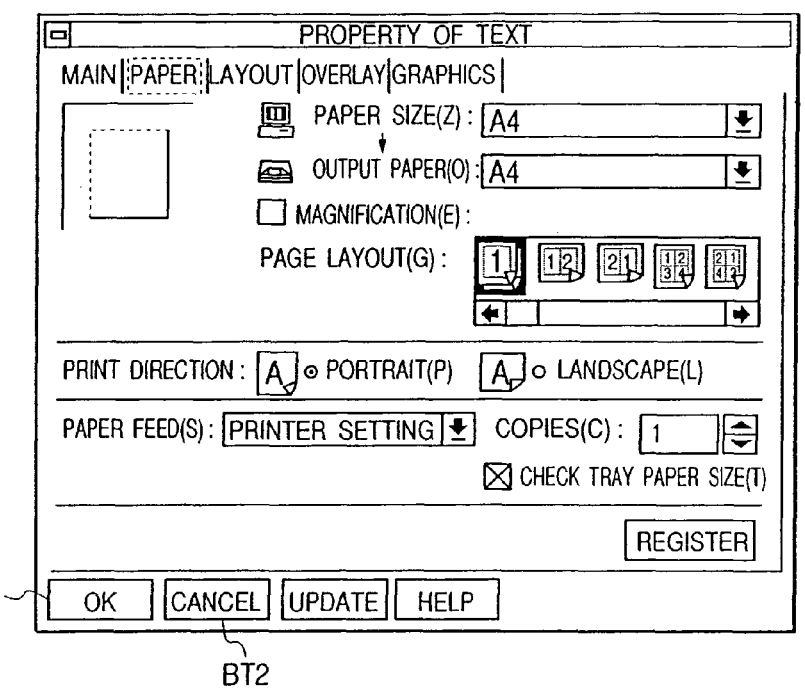
FIG. 4 is a view which shows one example of the user interface (UI) screen displayed on the CRT indicated in FIG. 2.

Now, hereunder, with reference to the user interface (UI) screens shown in FIG. 3 and FIG. 4, the description will be made of the example in which the various settings are executed by means of the one-action icon selection. Here, a printer is exemplified as the device which can communicate with the computer system 30. FIG. 3 and FIG. 4 are views which illustrate one example of the user interface (UI) screens displayed on the CRT 11 represented in FIG. 2. FIG. 3 corresponds to the main sheet on which each of the group sheets is recapitulated. FIG. 4 corresponds to detailed sheet of the sheet to be used. Also, the main sheet MSH is arranged to utilize the settings already registered by selecting the corresponding icon.

In FIG. 3, the TIC-1 to TIC-4, The PIC-1 to PIC-4, the LIC-1, the OIC-1 to OIC-3, and the GIC-1 are the corresponding icons, respectively. The selected icon is indicated in the highlight on the display screen. In the current status, all the icons correspond to the condition of the default selection, respectively.

In accordance with the present embodiment, the icon list is characterized in that it contains in this sheet the overall icon and each icon of all the groups. The currently selected icon is indicated in the highlight on the display screen so that the current settings are readily recognizable.

In this respect, if any setting should be made for the item which has not been registered on the icon shown in FIG. 3, the group sheet shown in FIG. 4 is open for the intended setting of such item.

Figure 5A:
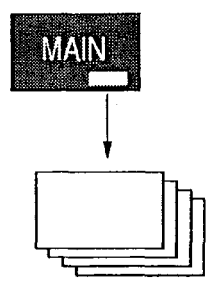
FIGS. 5A and 5B are views which illustrate the structural example of the setting sheets for the information processing apparatus having the system in accordance with the present embodiment.
Figure 5B:

FIGS. 5A and 5B are views which illustrate the structural example of the setting sheets for the data processing device of the present embodiment: FIG. 5A is a type where the main sheet is placed on the first step layer, and then, the second step layer that contains each group is displayed when the detail setting button is depressed on the main sheet; and FIG. 5B is a type where all of them are placed on the same step layer, and the main sheet is brought to the head thereof. For the present embodiment, the latter type, that is, the one shown in FIG. 5B, is adopted.

Now, with reference to FIG. 6, the description will be made of one example of the setting information which should be registered in advance.

FIG. 6 is a view which shows one example of the setting information to be registered in advance on the external memory 12 represented in FIG. 2, which corresponds to the setting data selective by the sheet of each group indicated by the icon on the main sheet MSH represented in FIG. 3, as well as to the setting date by icons which sets all the setting data altogether. Here, as to the default, no setting is needed. Also, it may be possible to arrange the structure so that the setting information is loaded from the external memory 12 to the RAM 2 and stored thereon.

In FIG. 6, the "4 UP" for the use of the source list is set and registered as to the paper sheet to be used, and the lower cassette (containing the back sheets) is set and registered as to the paper feed method. Then, this arrangement corresponds to the case where the user defined paper sheet and the paper feed method therefor are set and registered for use of the chits A/B.

As the overlay, this arrangement corresponds to the case where the format is set and registered correspond to each of the formats for use of the chits A/B.

As the overall arrangement, it is assumed that the above-mentioned paper sheet, and the overlay setting are registered as to the paper/layout/overlay/graphics (vertical lines in FIG. 6), and also, as to the default/source list/chit A/chit B (horizontal lines in FIG. 6).

Now, with reference to the flowchart shown in FIG. 7, the description will be made of the automatic operation of the setting changes of the registered items by the designation of the icon selection in accordance with the present embodiment.

Figure 7:
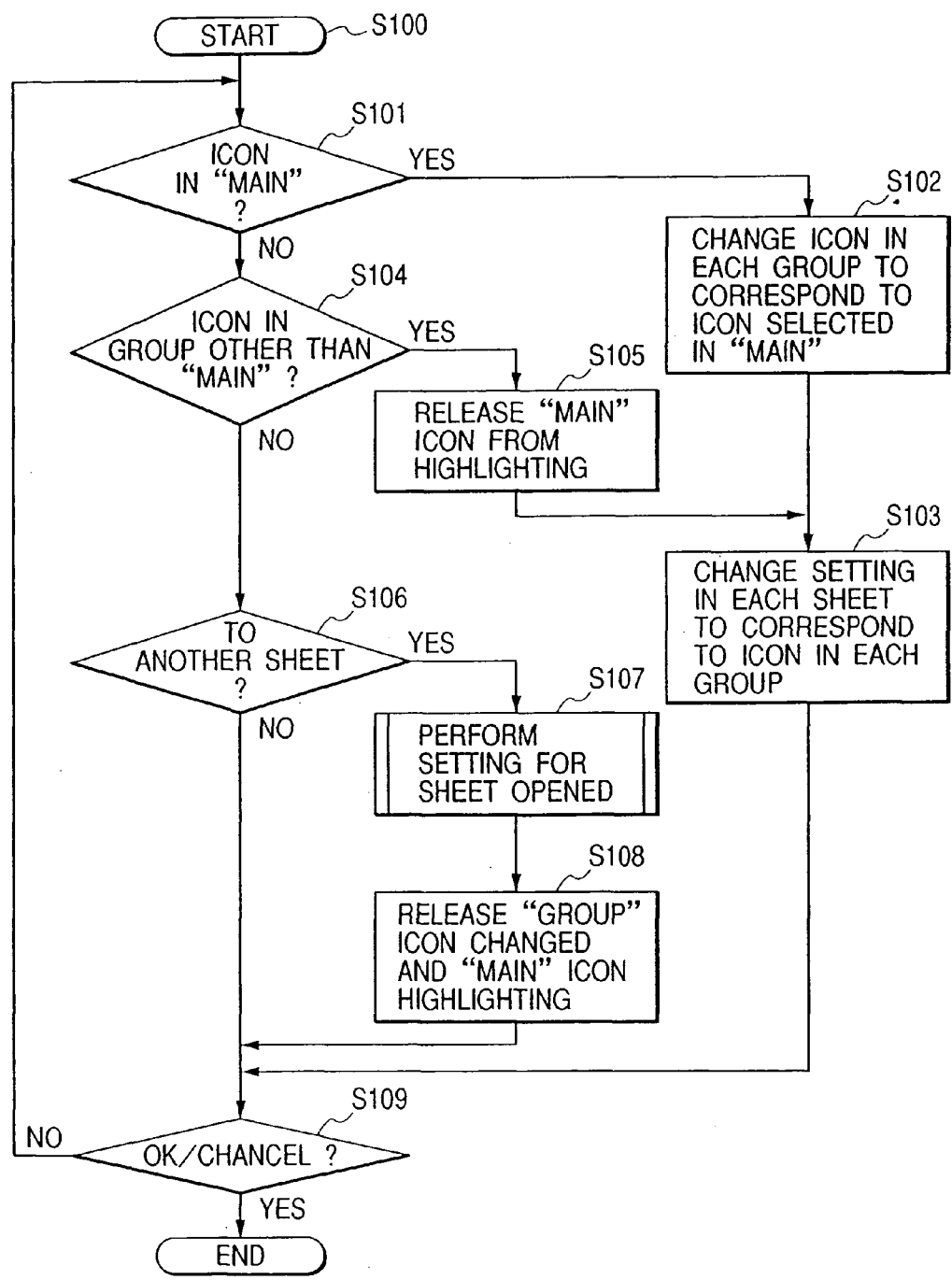
FIG. 7 is a flowchart which shows one example of the data processing procedures for the information processing apparatus having the system in accordance with the present embodiment.

FIG. 7 is the flowchart which shows one example of the data processing procedures for the data processing device in accordance with the present embodiment, which corresponds to the procedures of the automatic process of the setting changes of the registered items by the designation of icon selection (that is, the operation of the user interface shown in FIG. 3). Here, reference numerals S100 to S109 designate each of the steps, respectively.

Now, when the automatic process of the setting change is initiated in S100, it is determined in step S101 whether or not any one of the icons on the "overall" icon list (the default icon TIC-1, the source list icon TIC-2, the chit A icon TIC-3, and the chit B icon TIC-4) is selected in the state where the main sheet MSH shown in FIG. 3 is open on the CRT 11. If it is determined that one of the default icon TIC-1, source list icon TIC-2, chit A icon TIC-3 and chit B icon TIC-4 is selected by the operation of the pointing device, the icon of each group is changed in step S102 to the one registered on the icon selected from among the "overall" ones. Then, in step S103, the setting on each sheet is reset to the contents that correspond to the icon of each group. Thus, the process proceeds to step S109 and on.

On the other hand, if it is determined in the step S101 that none of the default icon TIC-1, the source list icon TIC-2, the chit A icon TIC-3, and the chit B icon TIC-4 is selected by the operation of the pointing device, it is determined in step S104 whether or not any one of the icons is selected and changed from among the icons on the icon list of the groups other than the "overall" ones. If affirmative, the highlighted indication of the icons selected from the "overall" ones is released in step S105. Then, the process proceeds to step S103 where the setting on the sheet of the group, which has been changed, is reset to the contents corresponding to the selected icon.

Here, with the release of the highlighted indication of the "overall" ones, the current setting can be made different from the icon selected from among the "overall" ones by changing the setting of the group.

On the other hand, if it is determined that there is no change, it is further determined in step S106 whether or not there is any instruction to open other sheet. If affirmative, the setting of each sheet is made conventionally in step S107. Here, if the setting is changed, the highlighted indication of the group icon and that of the "overall" icon of the sheet whose contents are changed are released in step S108. Then, the process proceeds to step S109. Here, the releasing process in the step S108 is to make the current setting different from the icon selected from among the "overall" ones by changing the setting of the group.

On the other hand, if it is determined that there is no instruction as to opening in the step S106, it is further determined in S109 whether or not either one of the OK button BT1 and the cancel button BT2 shown in FIG. 3 is depressed. If neither OK button BT1 nor the cancel button BT2 is depressed, the process returns to the step S101. If the OK button BT1 is found to be depressed, the current setting is left intact, and if the cancel button BT2 is found to be depressed, the current setting is discarded and the user interface is closed to terminate the process.

In this way, when the source list is printed, the paper sheet setting is as indicated on the source list as shown in FIG. 6, and the setting of all other groups is each in "default" as shown in FIG. 6 if the source list icon TIC-2 is selected from among the "overall" ones on the display screen of the user interface shown in FIG. 3. Then, the contents of each sheet is reset to the setting of the icon correspondingly. Here, if the "4 UP" and "back sheet" should be used while other settings are left intact, it is good enough if only the icon PIC-2 of the "paper sheet" is selected on the display screen shown in FIG. 3.

Also, when documents should be printed by use of several kinds of formats as the case may be, it has been required conventionally to change all the related items simultaneously, such as the paper sheet, paper feed, the form of overlay, among some others. In accordance with the present embodiment, however, if the "overall" icon TIC-3 for the "chit A" is selected on the display screen of the user interface shown in FIG. 3, the setting of the related icons is also changed by one action accordingly, such as to the "paper sheet" to the "chit A", the "overlay" also to the "chit A", and all others to the "default" settings.

Likewise, if the "overall" icon TIC-4 for the "chit B" is selected, all the required settings are changed by one action, hence making it possible to reduce the frequency of the operational instructions significantly when several kinds of documents should be used as required.

In accordance with the embodiment described above, it is possible to make the desired settings by several actions, and by selecting the icon of each group, all the settings that belongs to that sheet only by one action. The changes of the items which are fundamentally related to a plurality of sheets can also be changed by several actions.

Also, the setting often used in particular can be arranged so as to be effectuated by one action. Then, by selecting the overall icon, all the settings can be made by one action. This arrangement is particularly effective when the regular work is performed more often.

Further, it becomes possible to make all the settings by use of one sheet. In other words, the icon selections on the screen is arranged within a range of one sheet portion. As a result, it is usually unnecessary to open other sheets. Only when printing is performed in some rear case which is not registered, the settings may be made on other sheet.

Also, the number of icons becomes smaller for use. In other words, since the settings can be registered per sheet, the number of icons needed becomes smaller accordingly. For example, four icons are registered for each of the sheets, and if there are four groups as in the present embodiment, the number of icons is 16 in total. However, it becomes possible to make settings in 256 (rising four to the fourth power) by four actions at the maximum.

Further, with the provision of the default icons, which can be arranged to be each individual icon to make it easier to operate returning to each of the default settings, the operation becomes easier to return the arbitrary sheet to the standard setting or to return the overall settings to the standard ones.

Consequently, with a smaller number of icons and with a small scale of the operation, it becomes possible to set the detailed attributes for the data, thus enhancing the efficiency of operation.

Second Embodiment

Figure 8:
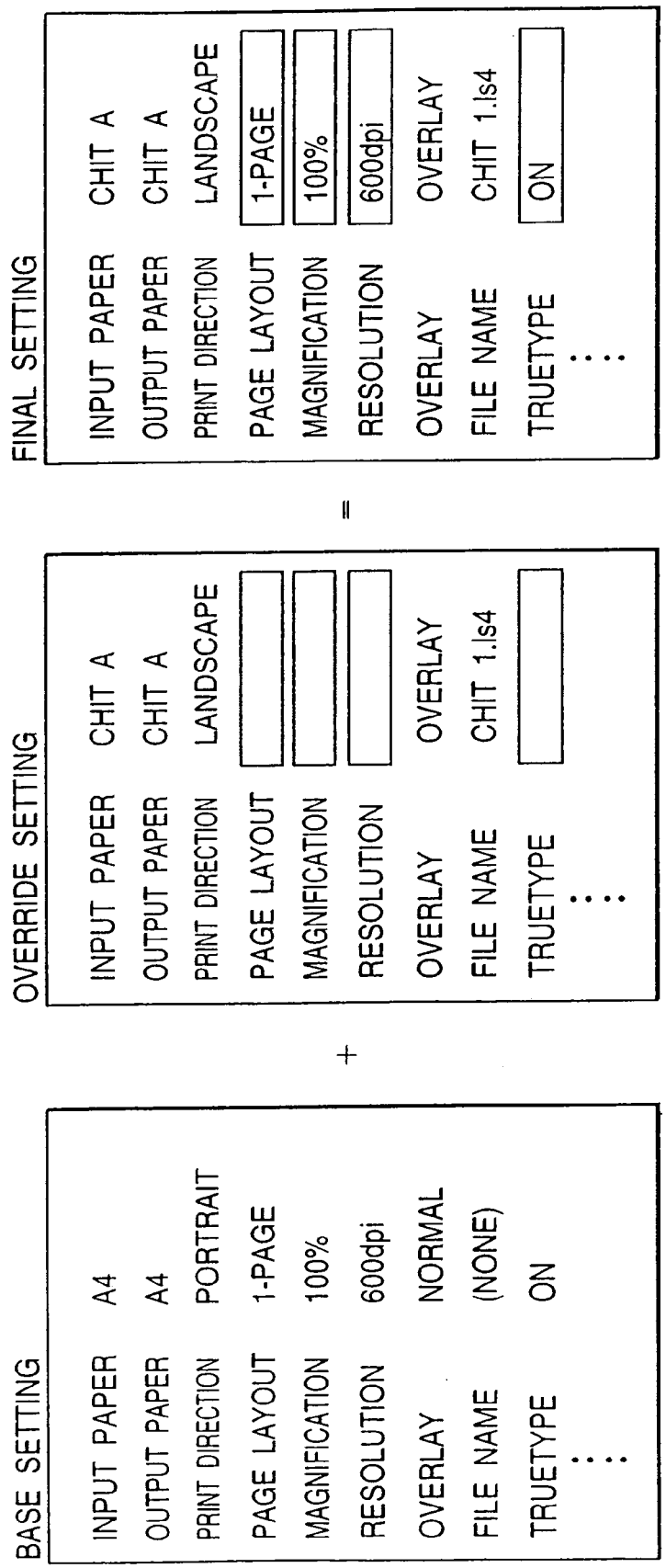
FIGS. 8A, 8B, and 8C are views which illustrate the concept of the override process in accordance with the present invention.
Figures 8A, 8B, 8C:
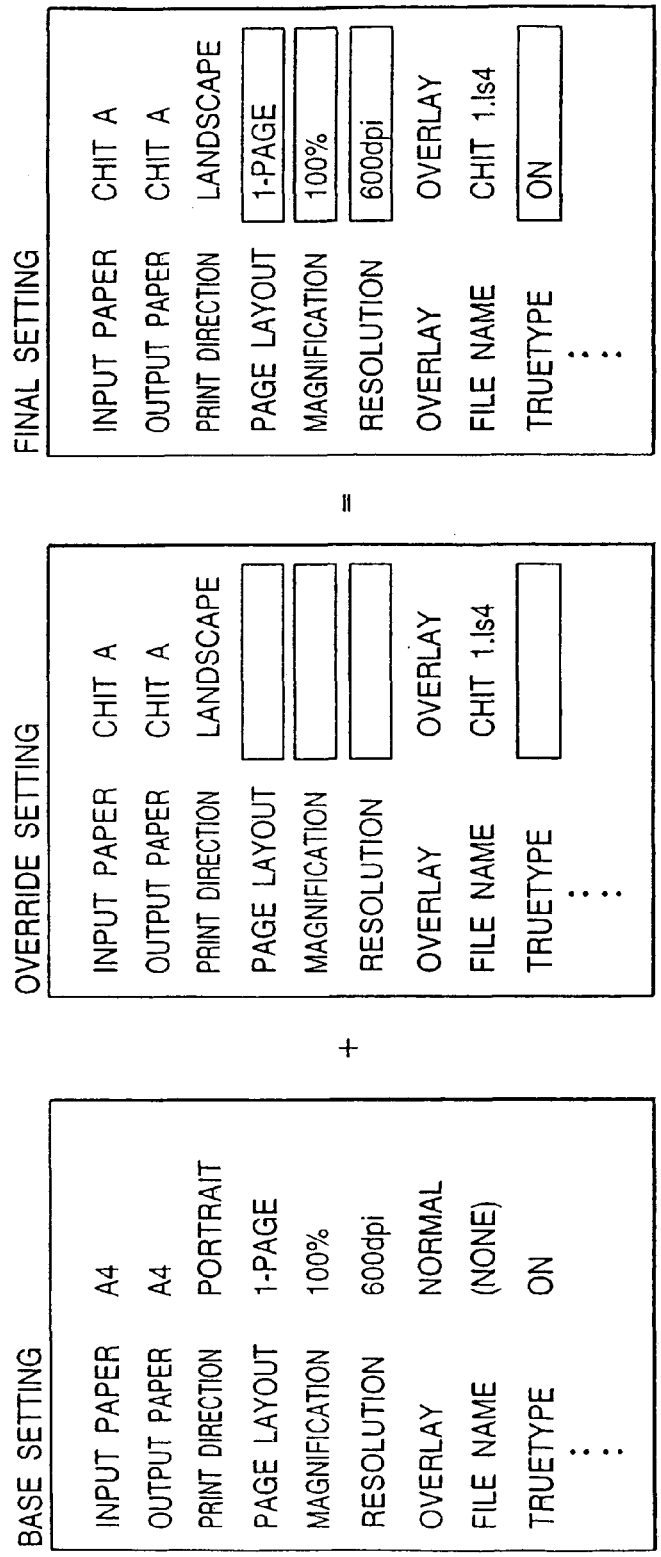

Now, the description will be made of a second embodiment in accordance with the present invention. At first, with reference to FIGS. 8A, 8B, and 8C, the concept of the override setting will be described. As shown in FIGS. 8A, 8B and 8C, when the override setting having the effective values only on the arbitrary items is superposed on the base setting (or on the current setting), the setting values are overwritten on the valid items, while the setting values which remain unchanged are still usable for the invalid items.

In other words, as shown in FIG. 8A, each item is defined as given below for the base setting: the input paper sheet: A4; the output paper sheet: A4; the printing direction: portrait; the page layout: 1 page print; the magnification: 100%; the resolution: 600 dpi; the overlay: normal print; the file name: (none); the true type transformation: on • • •. On the other hand, for the override setting (FIG. 8B), each item is set as follows:

Input paper sheet: chit A
Output paper sheet: chit A
Printing direction: landscape
Page layout: (no setting)
Magnification: (no setting)
Resolution: (no setting)
Overlay: overlay print
File name: "chit 1. 1s4"
True type transformation: (no setting) • • •

Therefore, if the base settings are overridden with the override settings, each of the setting values is overwritten on each item for which the override becomes valid as the final setting (FIG. 8C) as described above, while the previous values are used for the invalid items without any change. As a result, the following settings are effectuated:

Input paper sheet: chit A
Output paper sheet: chit A
Printing direction: landscape
Page layout: 1 page print
Magnification: 100%
Resolution: 600 dpi
Overlay: overlay print
File name: "chit 1. 1s4"
True type transformation: On • • •

It is arranged to make each of the override icons selective in plural times, and the registration of the icon selected later becomes valid at all times.

Now, at first, some utilization examples are described, in which the present invention is applicable as given below.

EXAMPLE 1

In the case of documents being handled in several kinds of formats.

| [Chit A] | |
| --- | --- |
| Input and output paper sheet | chit A (sheet defined by user) |
| Paper feed method | upper cassette |
| Printing direction | landscape |

-continued

| | |
|---|---|
| Overlay | "chit 1. 1s4" (having the format of the chit) |
| [Chit B] | |
| Input and output paper sheet | chit B (sheet defined by user) |
| Paper feed method | lower cassette |
| Printing direction | landscape |
| Overlay | "chit 2. 1s4" |

For the basic arrangement, the items suitable for the text document (high resolution and PDL mode) are selected. Then, the icons of these items are overridden so as to make the one-time operation possible to set or switch paper sheets, paper feeds, designations of form files, printing directions, and the like.

EXAMPLE 2

| [Bookbinding] | |
|---|---|
| Double side print | On |
| Binding position | arbitrarily designated |
| Binding margin | arbitrarily designated |

For the basic arrangement, the settings are selected in accordance with the print object (for example, if pictures and figures are many, the image system (middle resolution and image mode) is selected; if text prints are many, the documentation system or the like is selected). Then, with the overriding of the above settings, it becomes possible to effectuate the bookbinding setting for various types of documents easily.

EXAMPLE 3

| [Program List] | |
|---|---|
| Input and output paper sheet | A4 |
| Paper feed direction | lower cassette (back sheet or the like) |
| Printing direction | portrait |
| True Type | transformed (high-speed) |

This setting arrangement is to save the paper sheets, and make the higher printing possible.

As the utilization examples described above, in accordance with the present invention, it becomes possible to perform setting changes arbitrarily with a smaller number of icons and simpler operations if only several of the basic icons and overridden icons are registered.

The Registration of Icons

Figure 9:
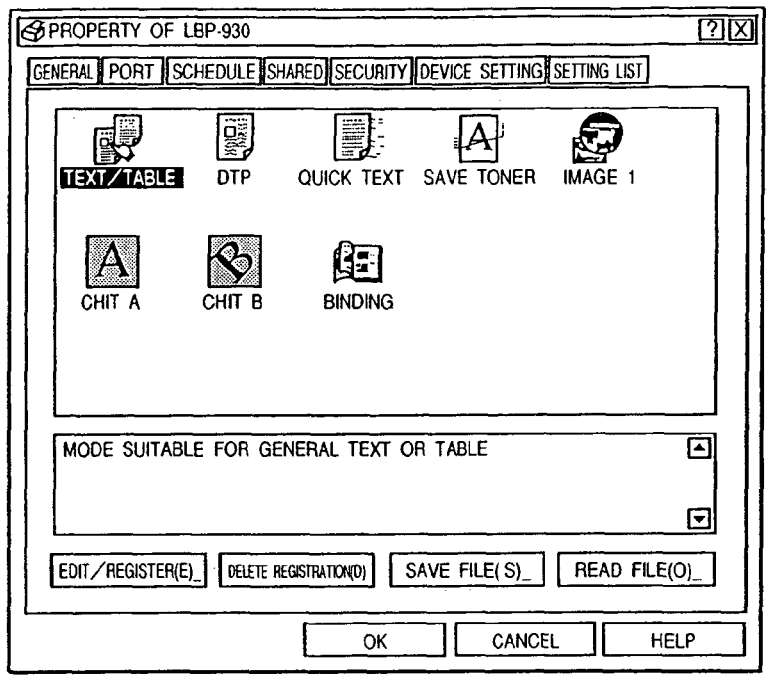
FIG. 9 is a view which shows the basic sheet of the registration process serving as one example of the user interface.
Figure 10:
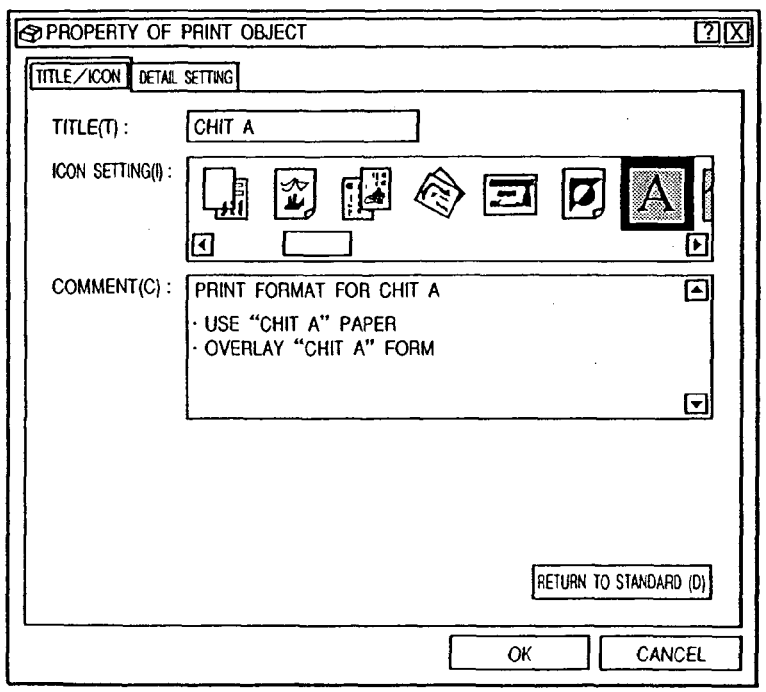
FIG. 10 is a view which shows the title, icon, and comment setting sheet serving as one example of the user interface.
Figure 11:
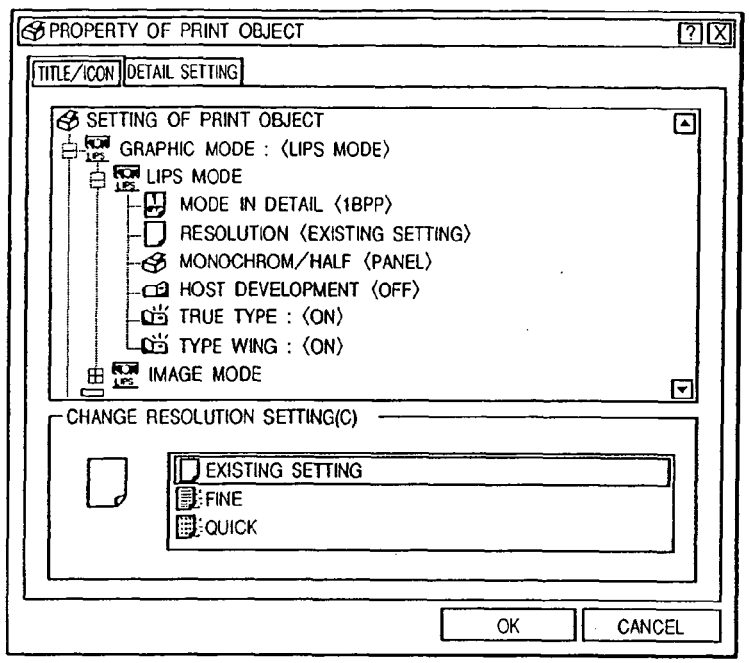
FIG. 11 is a view which shows the setting sheet for each of items in detail serving as one example of the user interface.

In conjunction with FIG. 9 to FIG. 12, the description will be made of the method for registering a plurality of setting items as one recording unit. FIG. 9 to FIG. 11 are views which illustrate the examples of the user interface for the setting registration in accordance with the first embodiment. FIG. 9 is the basic sheet having the listing portion of the registered icons; the comment column to explain the listed icons; and the "edit and registration" buttons through which new settings or changes of the set contents. The basically set icons are shown on the upper row of the icon listing portion, and the overriding icons are shown on the lower row thereof (position A . . . ).

The sheet shown in FIG. 10 is for the setting of the title, design, and comment of the icon to be registered.

The sheet shown in FIG. 11 is for the setting of each of the items to be registered. Here, if the designation "to follow the existing setting" is selected, the existing one is taken over. If any other designation is selected, it means that the setting thus designated becomes validated.

The sheets shown in FIG. 10 and FIG. 11 are freely replaceable between them until the "OK" button or the "Cancel" button is depressed. With the "OK" button being depressed, the set contents are registered at that time. If the set title is the existing one, the icon data of that title is updated. If no title exists, the icon data is registered anew.

Figure 12:
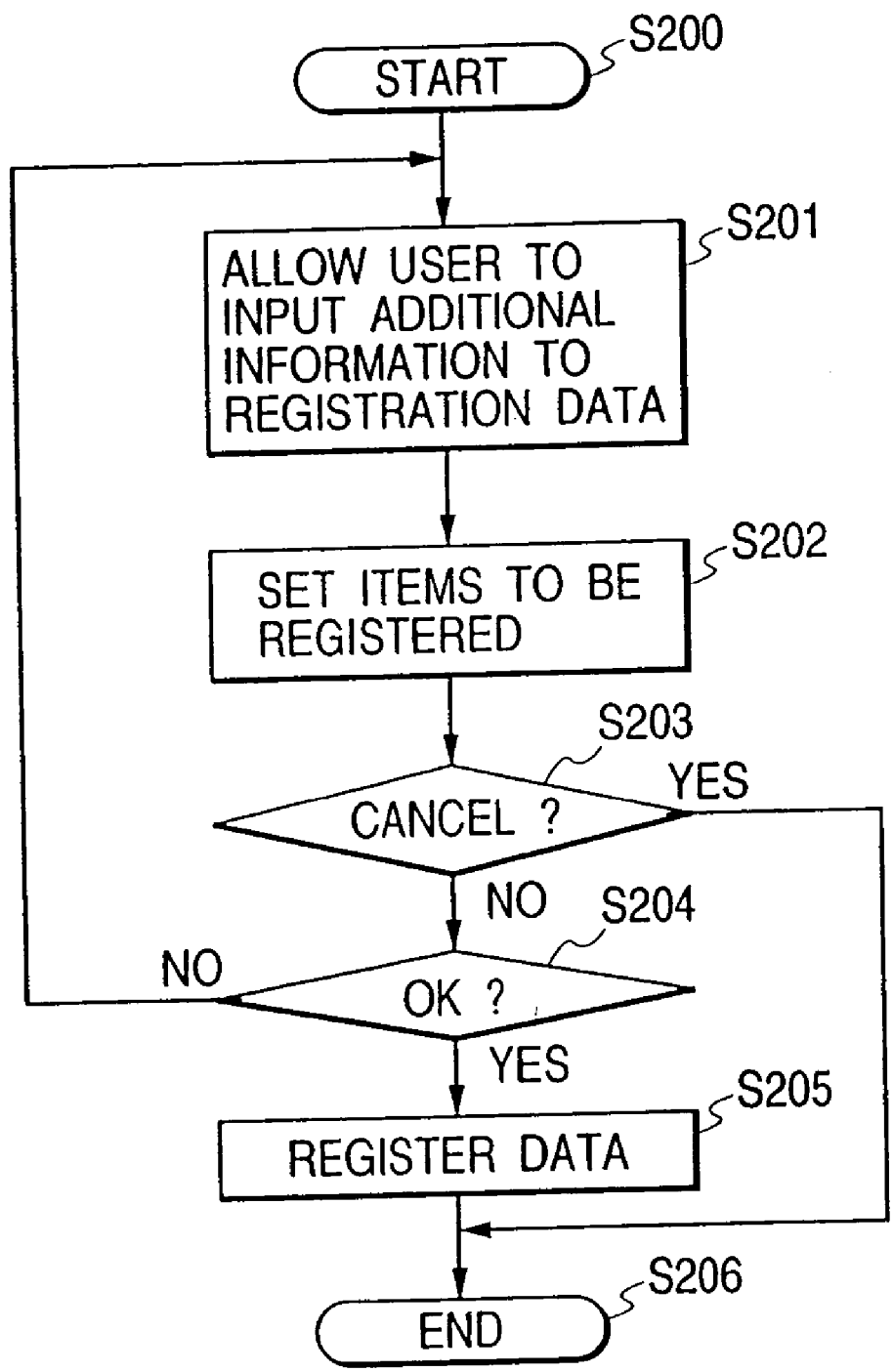
FIG. 12 is a flowchart which shows the process of registration of each device setting on the icon for the information processing apparatus having the system in accordance with the present embodiment.

Now, FIG. 12 is a flowchart which illustrates the control program of the printer driver stored on the external memory 12 or on the ROM 8 of the host computer 30. In conjunction with the flowchart shown in FIG. 12, the registration flow will be described. The system enters the registration setting mode (step S200) after either one of the icons is selected by the user. Then, the user inputs the additional data on the registration of the title, comment, and others through the KB 10 (step S201), hence setting the items which should be registered actually (step S202). It is assumed that the initial values of these data are the initial values registered on the icons thus selected. For the setting items, there are those selective with the effective setting values, and those selective without any setting values but those taken over from the existing values. If all the items are provided with the effective setting values, the basic settings are obtained. If only the arbitrarily local items are provided with the effective values, the override settings become obtainable.

Here, if the setup is canceled (step S203), the process terminates without any process (step S206). If the setup is OK (step S204), the registration data are registered on the external memory 12 at that time (step S205). Then, the process terminates (step S206). The steps S201 and S202 are executable until either the OK or the Cancel is designated.

The Data Setting by Use of Icons

In conjunction with FIG. 13 to FIG. 16, the description will be made of the method for changing the data settings of a plurality of item by use of icons.

Figure 13:
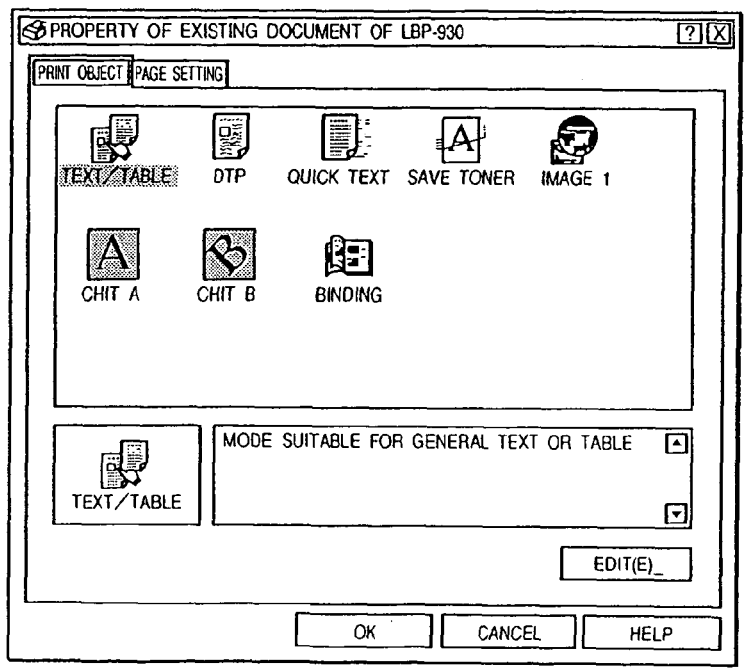
FIG. 13 is a view which shows the basis sheet 1 for the data setting process serving as one example of the user interface.

FIG. 13 shows the basic sheet having the listing portion of the registered icons; the icon indication portion that shows the currently basic icons; the comment row that indicates the icon explanation; and the "edit" button through which the settings are changed in detail.

Figure 14:
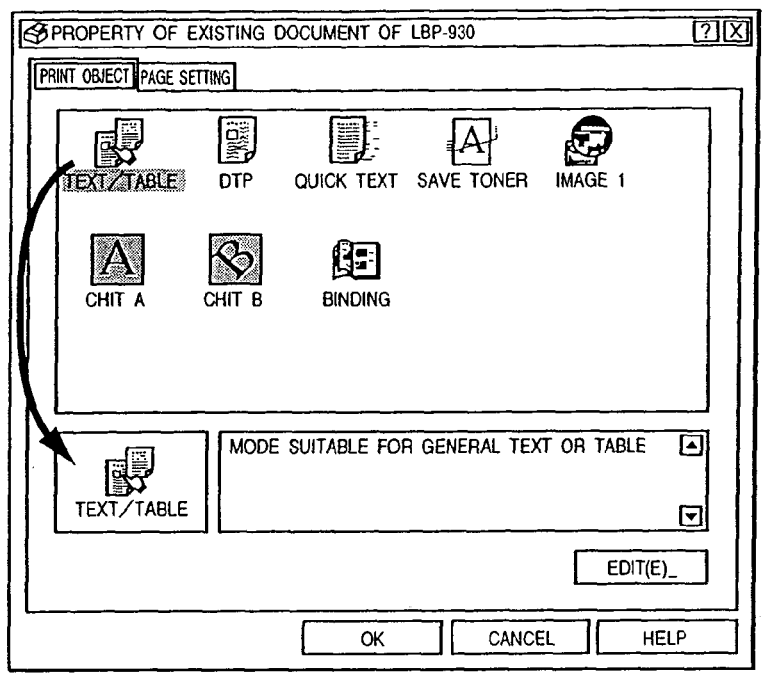
FIG. 14 is a view which shows the selection flow of the basic icon.

FIG. 14 shows the state where the basic icons are selected. By means of drag and drop of each of the basic icons to the icon indication portion, the setting value of such icon becomes effective. Then, the icon which has been drawn and dropped is indicated on the icon indication portion. On the comment portion, the comment that provided by that icon is indicated.

Figure 15:
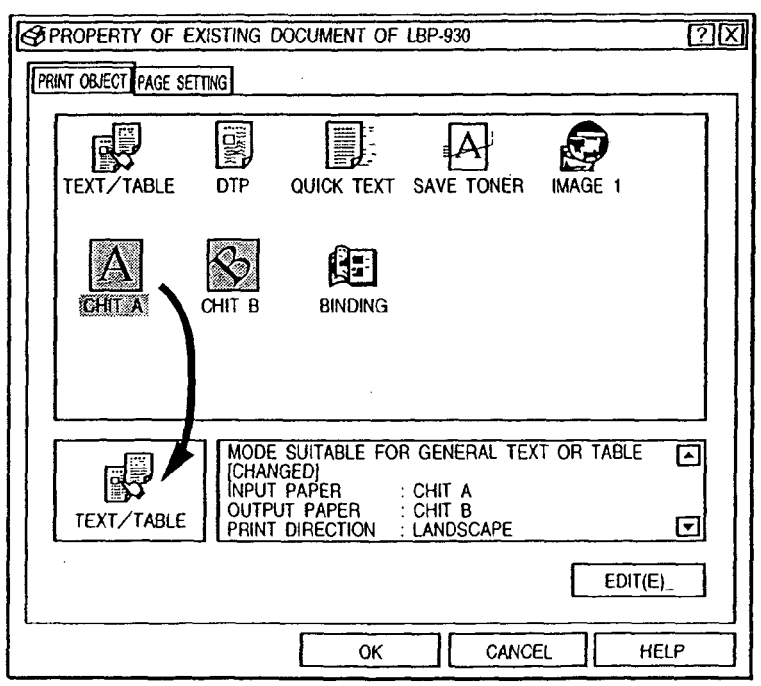
FIG. 15 is a view which shows the selection flow of the override icon.

FIG. 15 shows the state where the override icons are selected. When each of the override icons is drawn and dropped on the icon indication portion, the setting value is updated with respect to the effective item which has been registered on the override icon. At this juncture, the comment that describes each change (the list of updating items in FIG. 15) is indicated on the comment portion, respectively.

If any setting which has not been registered on the icon should be made, the existing setting is changeable in detail per item with the depression of the "edit" button.

Figure 16:
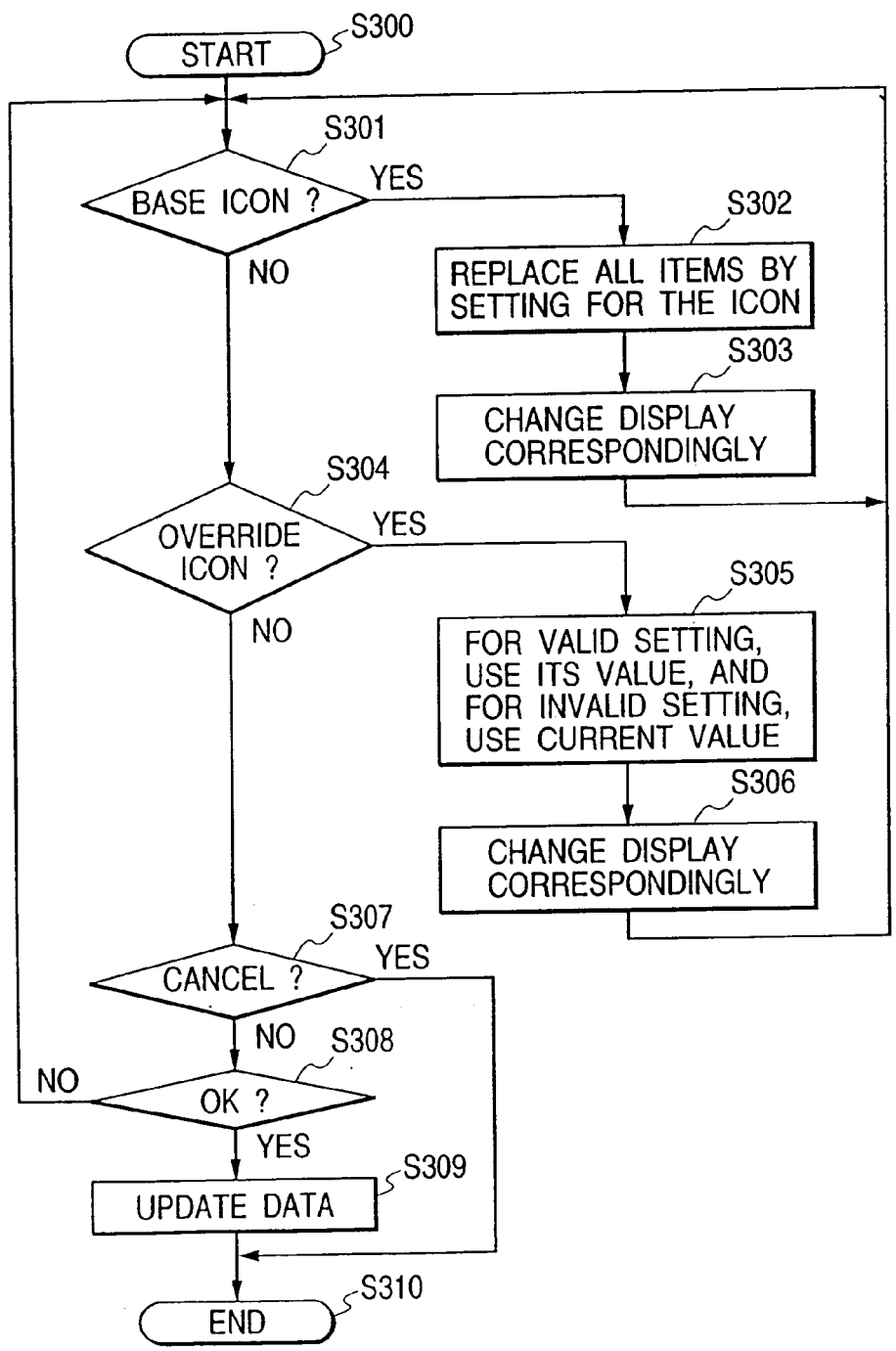
FIG. 16 is a flowchart which shows the data setting process by use of the icons for the device overriding of the information processing apparatus having the system in accordance with the present embodiment.

FIG. 16 is a flowchart which illustrates the control executed by the control program of the printer driver. Now, in conjunction with the flowchart shown in FIG. 16, the description will be made of the flow of the data setting changes. On the basic screen (step S300), if the printer driver determines that the user has selected the basic icons through the KB 10 (step S301), the values of all the objective setting items are substituted with the setting values of the respective icons (step S302), and the process is carried out for the display screen (step S303). If the printer driver determines that the user has selected the override icons (step S304), each item for which the setting is valid is updated to the setting value, but the invalid item is used as it is with the existing set value (step S305). In this case, too, the process is carried out for the display screen subsequent to the data processes accordingly (step S306). Here, if the process is canceled (step S307), the process escapes from the setting screen. If the process is OK (step S308), the data is updated, and the setting changes upto the last are validated. Thus, the data setting mode terminates (step S310). The steps from S301 to S306 are repeated until the OK or the Cancel is designated. Here, the override settings can be executed any times. In this case, the local updating is effectuated for the current setting (the last setting).

The Data Setting by Use of Icons

Now, in conjunction with FIG. 17 to FIG. 20, the description will be made of the method for changing the data settings of a plurality of items when icons are used.

In accordance with the present embodiment, the basic icons and the override icons are not discriminated (all of them are handled as the override icons). The setting of each icon which has been selected is always overridden.

Figure 17:
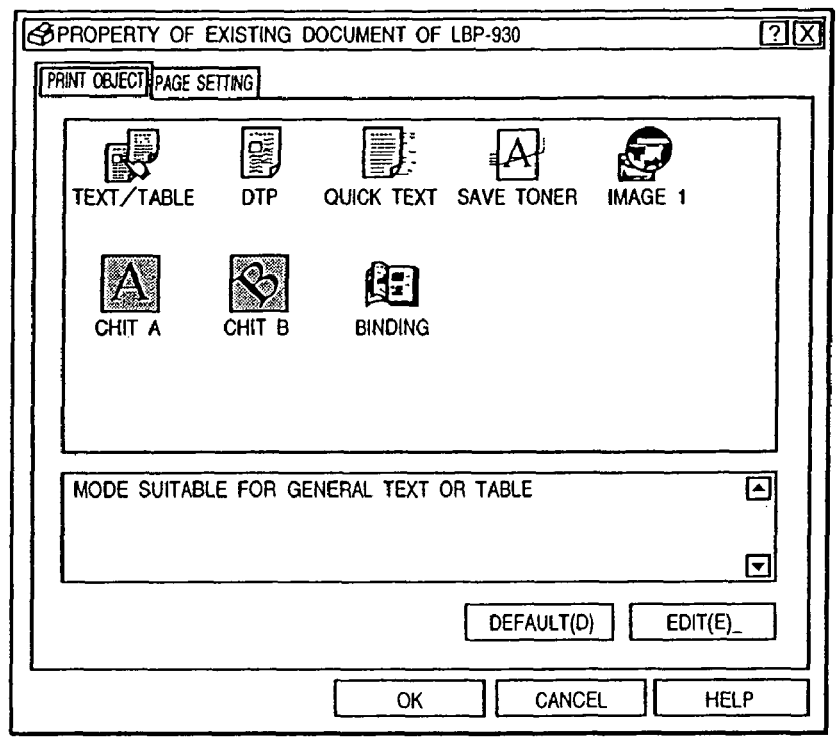
FIG. 17 is a view which shows the basic sheet 2 for the data setting process serving as one example of the user interface.
Figure 18:
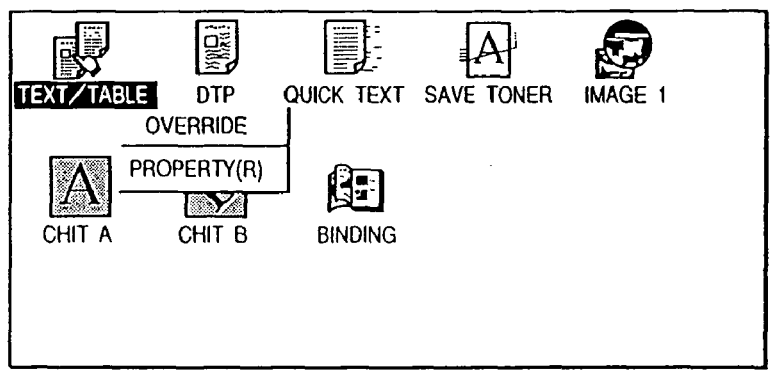
FIG. 18 is a view which shows the selection from the menu serving as one example of the user interface.

FIG. 17 is the basic sheet. As compared with the method described above, there is no icon indication portion, but a "default" button. For the selection of any one of the icons, double-click, floating pop-up menu shown in FIG. 18 or the like is used. It is of course possible to use the drag and drop method by providing the reception port as described earlier. The valid item of icon thus selected is overridden with the current setting. In this respect, with the depression of the "default" button, it is possible to reset all the setting items to the default values.

Figure 19:
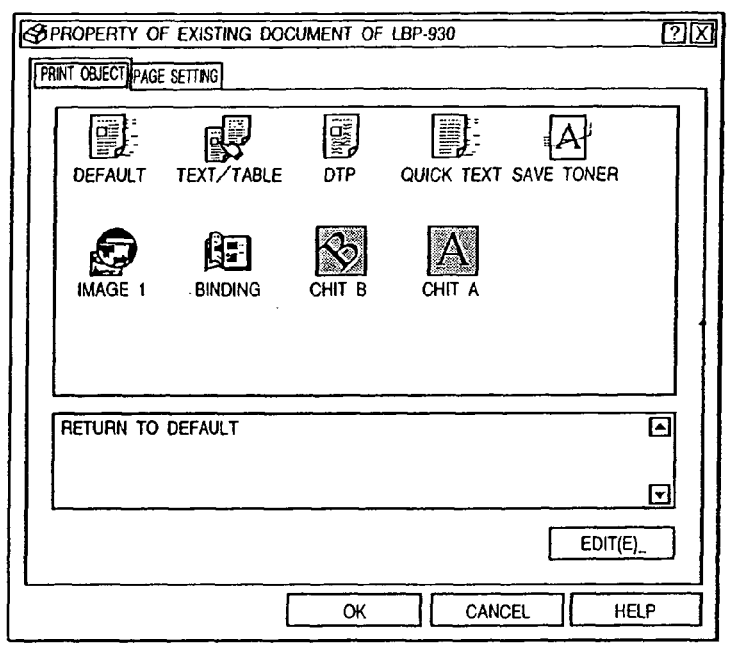
FIG. 19 is a view which shows the basic sheet 3 for the data setting process serving as one example of the user interface.

FIG. 19 shows the example in which the default setting is possible in the same manner as above by the preparation of a default icon, not the default button.

Figure 20:
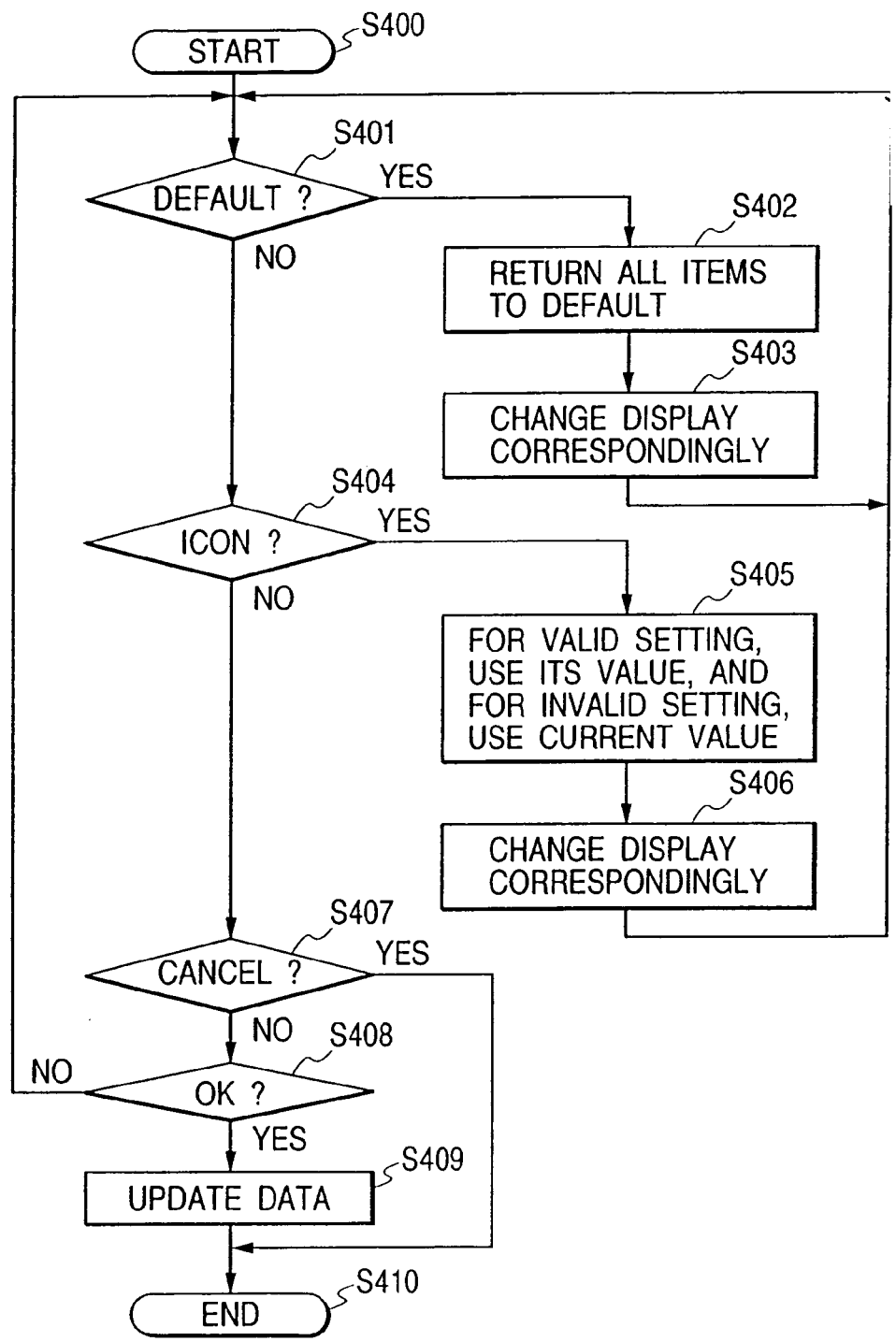
FIG. 20 is a flowchart which shows the data setting process by use of icons for the device overriding of the information processing apparatus having the system in accordance with the present embodiment.

FIG. 20 is a flowchart which illustrates the control executed by the control program of the printer driver. Now, in conjunction with the flowchart shown in FIG. 20, the description will be made of the flow of the data setting changes. On the basic screen (step S400), if the printer driver determines that the user designates the resetting to the default (step S401), all the objective setting items are reset to the default setting values (step S402). Then, the display screen is processed (step S403). When the icon is selected (step S404), the setting values of the items whose settings are valid are updated, but the setting values of the invalid items are used without any change (step S405). In this case, too, the display screen is processed accordingly subsequent to the data processes (step S406). Here, if the cancel is selected (step S407), the process escapes from the setting screen without any process, but if the OK is designated (step S408), the data are updated to make the setting changes up to such designation effective (step S409). Then, the data setting mode terminates (step S408).

Figure 23:
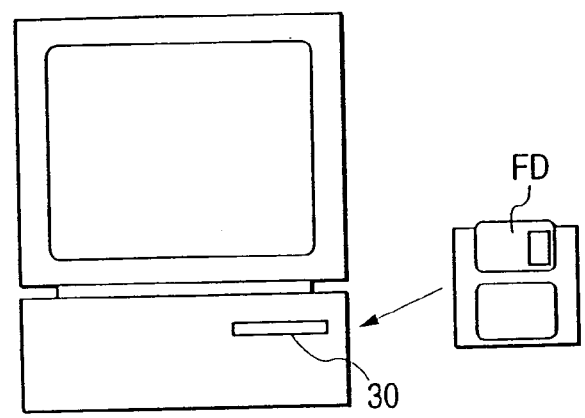
FIG. 23 is a conceptual view which shows the state where the program to be stored on the disk is being loaded on the host computer.

FIG. 23 is the conceptual view which shows the state where the floppy disk (FD: a storage medium) serving as the external memory 12 is installed on the host computer 30 in the mode of the present embodiment, and the program stored on the disk is being loaded on the host computer 30.

The medium, which is provided with the program codes of the software to implement the functions of the previous embodiment, is supplied to the system or the apparatus. Then, the computer (or CPU or MPU) of such system or apparatus reads the program codes stored on the storage medium for the execution thereof to attain the objectives of the present invention. In this case, the program codes themselves read from the storage medium implement the new functions of the present invention. Therefore, the storage medium that stores the program codes is regarded to constitute the present invention.

As the storage medium that supplies the program codes, there are adoptable for use, the floppy disk, the hard disk, the optical disk, the opto-magnetic disk, the CD-ROM, the CD-R, the magnetic tape, the non-volatile memory card, the ROM, or the like, for example.

Also, it is included in the scope of the present invention that not only the case where the functions of the aforesaid embodiments are implemented by the execution of the program codes read out by the computer, but also, the case where the OS or the like that operates on the computer to execute partially or totally the actual processes on the bases of the instructions from the program codes so as to implement the functions of the aforesaid embodiments by the processes thereof.

Further, it is included in the scope of the present invention that after the program codes read out from the storage medium are written on the expanded functional board inserted into the computer or the expanded functional unit connected with the computer, the CPU or the like arranged for such expanded functional board or the expanded functional unit executes partially or totally the actual processes on the basis of the instructions from the program codes so as to implement the functions of the aforesaid embodiments by the processes thereof.

As described above, in accordance with the present invention, the basic settings for setting the all the items and the override setting for setting the arbitrary items are prepared, and then, the basic settings (all item settings) are overridden with the override settings. In this way, it becomes possible to obtain the information processing method, the information processing apparatus, and the storage medium having the process procedures stored thereon whereby to make the desired settings from among the required groups of settings easily.

Also, since all the items can be registered, it becomes possible to complete the required settings by selecting the icons with the registration of the brief settings for the operation that deals only with the several kinds of the printed objects. Also, since the arbitrary items can be made effective, the required number of icons can be registered each having the paper sheet, the paper feed method, the form files, and other items registered as a set, and such icon can be used in combination even when the documents that should be handled become great. Therefore, there is no need for increasing the number of icons considerably. Also, if only the required items are registered so as to keep the conventional print quality or the like, the system can be used exactly as in the conventional one.

In this way, it becomes possible to make the detailed settings easily with a smaller scale of operation with a smaller number of icons, hence enhancing the efficiency of operation significantly.

What is claimed is:

1. A data processing apparatus that sets a print setting via a graphical user interface including a setting screen for a plurality of setting sheets, each setting sheet including a group of selectable print setting items, the apparatus comprising:
   first retention means for retaining, for each of the plurality of setting sheets, a group of print setting items registered for each sheet, the print setting items being selectable via the graphical user interface;
   second retention means for retaining an overall setting item registered as a combination of at least one of the print setting items retained by said first retention means, the overall setting item being selectable via the graphical user interface; and
   setting means for setting the print setting based on the overall setting item retained by said second retention means in the case that the overall setting item is selected via the graphical user interface, and, in the case that a certain group of print setting items retained by said first retention means are selected via the graphical user interface, for setting the print setting based on the selected group of print setting items.

2. An apparatus according to claim 1, wherein said first retention means retains, for each of the plurality of setting sheets, a plurality of groups of print setting items.

3. An apparatus according to claim 1, wherein said setting means can select a standard setting for each of the groups via the graphical user interface, and sets the print setting based on the selected standard setting.

4. An apparatus according to claim 1, wherein said setting means displays at least one of the plurality of setting sheets on the setting screen and changes the print setting items for the displayed setting sheet.

5. A data processing method that sets a print setting via a graphical user interface including a setting screen for a plurality of setting sheets, each setting sheet including a group of print setting items, the method comprising:
   a first retention step of retaining, for each of the plurality of setting sheets, a group of print setting items registered for the sheet, the print setting items being selectable via the graphical user interface;
   a second retention step of retaining an overall setting item registered as a combination of at least one of the print setting items retained by said first retention step, the overall setting item being selectable via the graphical user interface; and
   a setting step of setting the print setting based on the overall setting item retained by said second retention step in the case that the overall setting item is selected via the graphical user interface, and, in the case that a certain group of print setting items retained by said first retention step are selected via the graphical user interface, for setting the print setting based on the selected group of print setting items.

6. A method according to claim 5, wherein said first retention stop retains, for each of the plurality of setting sheets, a plurality of groups of print setting items.

7. A method according to claim 5, wherein said setting step can select a standard setting for each of to groups via the graphical user interface, and sets the print setting based on the selected standard setting.

8. A method according to claim 5, wherein said setting step displays at least one of the plurality of setting sheets on the setting screen and changes the print setting items for the displayed setting sheet.

9. A data processing program stored on a computer-readable medium, the program for setting a print setting via a graphical user interface including a setting screen for a plurality of setting sheets, each setting sheet including a group of print setting items, the program comprising:
   a first retention step of retaining, for each of the plurality of setting sheets, a group of print setting items registered for the sheet, the print setting items being selectable via the graphical user interface;
   a second retention step of retaining an overall setting item registered as a combination of at least one of the print setting items retained by said first retention step, the overall setting item being selectable via the graphical user interface; and
   a setting step of setting the print setting based on the overall setting item retained by said second retention step in the case that the overall setting item is selected via the graphical user interface, and, in the case that a certain group of print setting items retained by said first retention step are selected via the graphical user interface, for setting the print setting based on the selected group of print setting items.

10. A program according to claim 9, wherein said first retention step retains, for each of the plurality of setting sheets, a plurality of groups of print setting items.

11. A program according to claim 9, wherein said setting step can select a standard setting for each of the groups via the graphical user interface, and sets the print setting based on the selected standard setting.

12. A program according to claim 9, wherein said setting step displays at least one of the plurality of setting sheets on the setting screen and changes the print setting items for the displayed setting sheet.

* * * * *

UNITED STATES PATENT AND TRADEMARK OFFICE
CERTIFICATE OF CORRECTION

PATENT NO. : 7,193,736 B2  Page 1 of 1
APPLICATION NO. : 10/610599
DATED : March 20, 2007
INVENTOR(S) : Minagawa It is certified that error appears in the above-identified patent and that said Letters Patent is hereby corrected as shown below:

COLUMN 14:
Line 11, "to" should read -- the --.

Signed and Sealed this

Fourth Day of March, 2008

JON W. DUDAS
*Director of the United States Patent and Trademark Office*